United States Patent [19]

Jacobi

[11] 4,040,185
[45] Aug. 9, 1977

[54] LADLE FOR SERVING SOUP

[76] Inventor: Jacob Jacobi, Simon van Capelweg 10, Noorden, Netherlands

[21] Appl. No.: 659,271

[22] Filed: Feb. 19, 1976

Related U.S. Application Data

[63] Continuation-in-part of Ser. No. 557,823, March 12, 1975, abandoned.

[30] Foreign Application Priority Data

Mar. 29, 1974 Netherlands .......................... 7404355

[51] Int. Cl.² .............................................. A47J 43/28
[52] U.S. Cl. ........................................ 30/326; 210/474
[58] Field of Search ................... 30/326, 324; 210/474

[56] References Cited

U.S. PATENT DOCUMENTS

| 118,140 | 8/1871 | Loeb | 30/326 |
| 1,368,448 | 2/1921 | Minch | 30/324 UX |
| 1,654,980 | 1/1928 | Le Duc | 30/326 X |
| 2,287,156 | 6/1942 | White | 30/326 UX |
| 2,795,119 | 6/1957 | Bair | 30/326 UX |

FOREIGN PATENT DOCUMENTS

| 1,013,301 | 4/1952 | France | 30/326 |
| 919,323 | 10/1954 | Germany | 30/324 |
| 1,083,177 | 9/1967 | United Kingdom | 30/326 |

Primary Examiner—Al Lawrence Smith
Assistant Examiner—J. T. Zatarga
Attorney, Agent, or Firm—Marshall & Yeasting

[57] ABSTRACT

A substantially hemispherical bowl is provided with a handle. An inner boat-shaped receptacle, which has a generally V-shaped cross-section and tapers toward each of its ends, is supported by the bowl in a generally inverted position relative to the bowl, with one side of the boat-shaped receptacle generally conforming to and slightly spaced from the inner surface of the bowl at one side of the bowl. The space between said side of the boat-shaped receptacle and the inner surface of the bowl forms a pouring passage extending from an inlet slot between the edge of such receptacle and the inner surface of the bowl to a discharge slot between the edge of the bowl and the bottom of such receptacle.

3 Claims, 5 Drawing Figures

LADLE FOR SERVING SOUP

CROSS REFERENCE TO RELATED APPLICATION

This is a continuation-in-part of application Ser. No. 557,823 filed Mar. 12, 1975, now abandoned.

BACKGROUND OF THE INVENTION

The present invention relates to a serving ladle for separating fat from a fatty liquid, comprising a bowl having an insert which divides the space in the bowl into a loading chamber and a through-flow chamber, said latter chamber communicating at one end with said loading chamber through a narrow slot, and at the other end having an outlet in or near the upper face of the bowl, said insert consisting of two walls of which the one wall is located in or near to the entry face of the bowl and thus partly covers said face and the second wall has a free edge reaching to the bottom of the bowl and defining together with the adjacent bottom of the bowl said slot.

Spoons or ladles of this type are used for serving out gravy, broth, soup, fatty milk or similar foodstuffs to separate the fatty component from the remainder of the liquid. This is important for consumers who need a fat-deficient or lean diet. On the other hand the same spoon can be used for normally serving out the liquid in question to other comsumers not bound by a diet. When serving, the spoon or ladle is immersed in, for instance, a gravy boat or soup tureen and the loading chamber is filled with liquid. Fatty substances float on the rest of the liquid which then flows through the slot into the through-flow chamber towards the outlet.

In the known construction the insert is formed in such a way, that the second wall of the insert is disposed in the middle plane of the bowl as a kind of partition, having the edge, which is turned away from the bottom of the bowl, connected to the wall located in the upper face of the bowl. The second wall is further provided with a recess serving as collecting chamber for fat. Its free edge reaching to the bottom of the bowl defines in copperation with said bottom the slot. In this way the volume of the bowl of the spoon or ladle is divided into two nearly equal chambers, so that only half of the bowl can be employed usefully as a loading chamber during each helping action.

A much more serious objection to the known spoon is that the pouring out of the fat-free or fat-deficient liquid must be stopped in time, since otherwise in the last stage inevitably the fatty layer sinks through the slot into the through-flow chamber, which entails the risk of said fatty layer joining through the outlet the lean gravy, soup, etc. already in the dish.

SUMMARY OF THE INVENTION

The invention has for its object to improve the known ladle by preventing said risk by shaping and/or arranging the insert such that a greater volume of liquid can be taken up in the loading chamber without it being necessary to deviate from stanard sizes of such spoons.

According to the invention there is provided a container for separating fat from a fatty liquid, such as a bowl with stem, for instance a spoon or ladle, having an insert which divides the space in the bowl into a loading chamber and a through-flow chamber, said latter chamber communicating at one end with said loading chamber through a narrow slot, and at the other end having an outlet in or near the upper face of the bowl, said insert consisting of two walls of which the one wall is located in or near to the entry face of the bowl and thus partly covers said face and the second wall has a free edge reaching to the bottom of the bowl and defining together with the adjacent bottom of the bowl said slot, characterized in that a fat collecting chamber is provided in the bowl near the outlet, whilst avoiding a direct communication between said collecting chamber through said slot towards the outlet of the through-flow chamber. During the pouring-out action of the liquid, the fat is trapped into this collecting chamber, while the fat-free or fat-deficient liquid can flow out at the outlet, for instance the pouring edge of the bowl of the spoon. Failing a direct communication between the collecting chamber and the through-flow chamber, the separation between fat and fat-free liquid is absolute and no taxations are needed about the time when, as with the known spoon, the pouring-out of the fat-free liquid has been completed and the flowing-out of the fat layer commences. This estimation of the proper time when the pouring-out must be stopped, is with the known spoon an imperative requirement since the fat concentration in the liquid can vary day after day.

Thus the fat-collecting chamber is located near the outlet of the bowl, and the bottom of said chamber is constituted by the two walls of the insert. In this way the collecting chamber is placed as near as possible to the pouring edge, so that a greater volume of the bowl of the spoon is available as the loading chamber for filling during immersing of the spoon into the liquid.

The first wall of the insert can extend a little outwards of the open upper face of the bowl of the spoon.

The second side wall can extend between the slot and the outlet, in close and preferably parallel relationship to the inner surface of the bowl. A construction is thus obtained in which virtually the entire volume of the bowl can be used as the loading chamber, while at the same time a greater part of said volume can be regarded as a fat-collecting chamber.

If the slot is covered by a strainer, the spoon or ladle can be used not only as fat-separator but also as clear-thick separator, for instance when ladling out soup. Moreover if the strainer, that in a first position rests against the bottom of the bowl, is swingable to a second position, in which it is spaced from said bottom, a separate passage is obtained for the thick of the soup. In this way a normal soup can be served containing the clear and the thick, but without fat.

Preferably the insert can be detachably supported in two diametrically opposed locations symmetrical in the bowl. In this way the spoon or ladle, with only one insert, can be used both by left-handed and by right-handed people. This can be realized for instance by snapping the insert into two diametrical points, being aligned with respect to the handle. It is to be preferred to provide for the insert to be fixable in one of the selected positions or after turning it about 180° in a plane coincident with the upper face of the bowl, in the other position. The insert is preferably detachable in order to clean it.

A spoon or ladle of the invention can be used, for instance as a gravy-spoon, ladle for broth or soup, a cream skimmer, or a table-spoon for consumers who, when dining out, want to take a fat-free or fat-deficient soup and for that purpose take with them their own spoon adapted i.e. provided with an insert - in accordance with the invention.

The invention also relates to the insert as such which can separately be placed in a spoon or ladle.

The invention is also applicable in other fields, such as for skimming oil floating on water or in a laboratory for the separation of two or more mixed liquids.

DESCRIPTION OF A KNOWN LADLE

Figure 1:
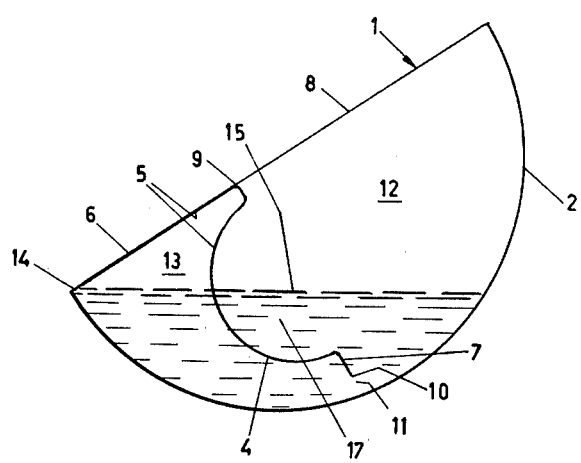
FIG. 1 is a diagrammatic cross-section of a known ladle, showing a layer of fat being separated in the ladle.

With reference to FIG. 1 a known ladle 1 comprises a bowl 2 and a handle, not-shown, but positioned below the plane of the drawing. Within the bowl 2 is an insert 5 with a recess 4, the insert consisting of a first wall 6 and a second wall 7. The first wall covers part of the upper, open face 8 of the bowl, while the second wall 7 is positioned near a plane of symmetry of the bowl 2, with a straight upper edge 9 connected to the wall 6, and a curved lower edge 10 reaching near the bottom of the bowl 2, and leaving a slot 11 between it and the bowl. Thus the wall 7 divides the bowl into two chambers, viz. a loading chamber 12 and a through-flow chamber 13. Near the end of the through-flow chamber 13 remote from the wall 7, is an outlet 14.

After filling of the loading chamber 12, the bowl is lifted horizontally out of the gravy-boat or soup-tureen, in which position the loading chamber 12 contains the fat gravy, soup or similar food-stuff. Thereafter the bowl 2 is tilted gradually above a dish into the position shown in FIG. 1.

Fat is then being separated from the rest of the liquid, and a fat layer 15 is floating on fat-free or fat-deficient liquid, which is flowing through the slot 11 into the chamber 13.

Figure 2:
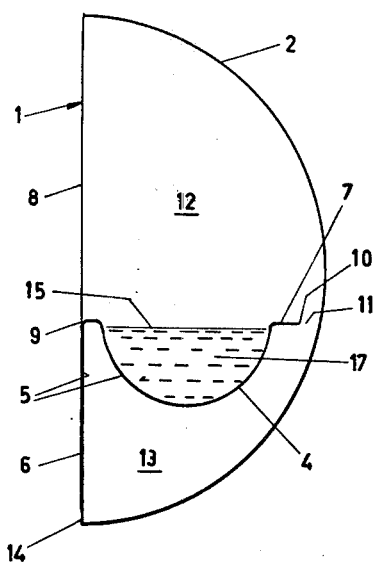
FIG. 2 is a view in which the known ladle has been turned to an upright position to trap the layer of fat which has been separated as shown in FIG. 1.

In FIG. 2 the bowl 2 has been turned to a vertical position, in which the fat-free liquid has flowed out and the fat layer 15 fills the relatively shallow collecting chamber 17. Turning the bowl 2 to the vertical position shown in FIG. 2 traps the fat layer 15 so that it can be returned to the tureen, although the precise moment when the ladle should be turned to this position is hard to determine, so that in practice it cannot be avoided that more or less fat will join the lean liquid in the dish. Another disadvantage of this known ladle is that each helping action produces only half a ladle of soup.

DESCRIPTION OF THE PREFERRED EMBODIMENTS

Figure 3:
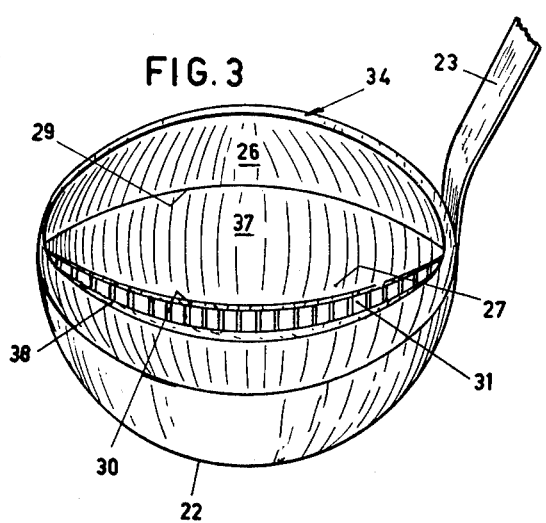
FIG. 3 is a perspective view of a ladle according to the invention.
Figure 4:
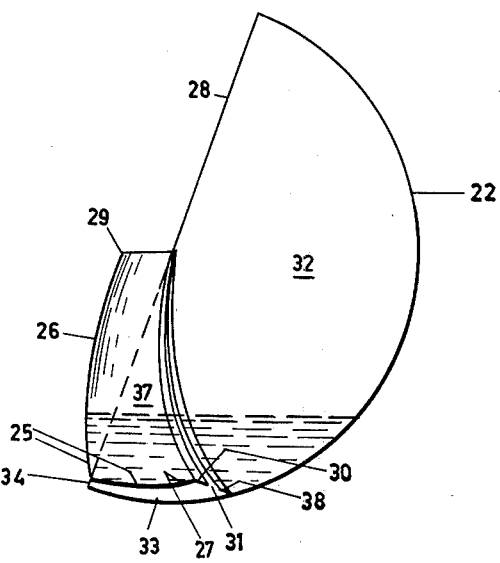
FIG. 4 is a diagrammatic cross-section of a modified form of ladle according to the invention, showing a layer of fat being separated in the ladle.
Figure 5:
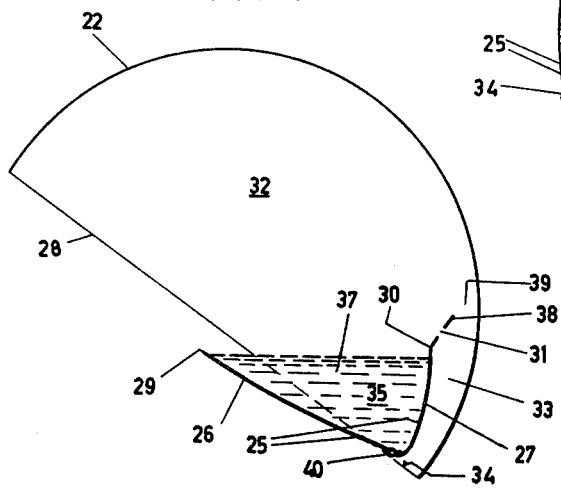
FIG. 5 is a diagrammatic cross-section showing a ladle according to the invention which has been turned to a position to trap a layer of fat which has been separated as shown in FIG. 4.

FIGS. 3 to 5 show embodiments of ladles according to the invention. In each there is provided a bowl 22, a handle 23, walls 26 and 27 of an insert 25, the outer edges 29 and 30 of the walls 26 and 27, a loading chamber 32, and a through-flow chamber 33. According to the invention a rather voluminous fat-collecting chamber 37 is provided, such that pouring out of any fat in the last phase of the helping action is excluded.

A first modification of the known ladle relates to the through-flow chamber 33 which is greatly reduced in volume by arranging the wall 27 in a position in which it extends in close, preferably parallel relationship to the bottom of the bowl 22. In this way virtually the entire volume of the bowl 22 functions as the loading chamber 32. In this construction the wall 26 closing the through-flow chamber projects a little beyond the upper face 28 of the bowl and also covers part of the loading chamber 32 so that the hollow recess 37 has sufficient volume to collect a greater quantity of fat 35.

Thus as liquid is dispensed from the outlet 34 of the ladle, there is a decreased chance of passing fat from the ladle.

A second modification, shown in FIG. 3, involves the slot 31 being covered by a strainer 38 for separating clear from thick soup, whilst simultaneously separating fat 35 by means of the fat-collecting chamber 37. This strainer, schematically indicated in FIG. 4, is clearly shown in FIG. 3. Preferably the strainer forms an integral part of the insert 25.

Substantially fat-free clear soup can be obtained through the outlet 34.

FIG. 4 shows a ladle embodying the invention in a position to separate a layer of fat while the fat-free liquid escapes through the outlet 34. FIG. 4 shows the ladle at the moment when substantially all of the fat-free liquid has escaped. At this moment, the ladle embodying the invention is turned to the position shown in FIG. 5, thus trapping the fat layer 35 in the receptacle 25.

Comparison of the ladle shown in FIG. 4, embodying the invention, with the known ladle shown in FIG. 1 makes it apparant that the ladle embodying the invention has the advantage that while the fat-free liquid is being drained below the layer of fat, the fat-free liquid escapes immediately from the outlet 34.

In contrast, in the situation shown in FIG. 1, at the moment when the known ladle must be turned to the position shown in FIG. 2 in order to trap the fat layer, a substantial amount of liquid still remains in the space 13 as shown in FIG. 1. This liquid remaining in the space 13kcreates back pressure which retards and interferes with the process of separating and trapping the layer of fat.

It will be apparent that in the use of the ladle embodying the invention as shown in FIG. 4, it is easy to detect the moment at which only the fat layer remains in the ladle, because at that moment some of the fat will be seen to begin emerging from the outlet 34. As soon as fat first appears at the outlet 34, the user knows that the moment has arrived to turn the ladle from the position shown in FIG. 4 to the position shown in FIG. 5 in order to trap the layer of fat.

For obtaining a thick fat-free soup, first the clear fat-free liquid is ladled out into a dish, by tilting the ladle anti-clockwise from the horizontal position as hereinbefore described. Next the ladle is tilted back to the horizontal position and carried to above the soup pan or tureen. Then the ladle is again tilted anti-clockwise to the vertical position, during which operation the fat flows back into the pan or tureen and exclusively the thick of the soup remains in the ladle; thereafter the bowl 22 of the ladle is tilted above the dish over about an angle of approximately 45° from the horizontal position in the opposite direction, so clockwise, so that the greater part of the "thick" of the soup goes to join the clear, lean liquid in the dish.

In any of the embodiments described above it is possible for the insert 25 to be mountable in two different positions, symmetrical with respect to the bowl, so as to allow the loading chamber to be on the right or the left as viewed by a user holding the spoon or ladle.

In a particular embodiment the strainer 38 is adjustable into two positions. As seen in FIG. 5 the wall 27 with the strainer 38 can be swung somewhat to the left, so that a passage 39 is obtained, through which the thick of the soup can pass. Thus in this second position the outlet 34 will deliver both clear and thick soup, whilst fat 35 can be trapped in the collecting chamber 37. For that purpose the wall 26 is provided near the wall 27 with a hinge 40.

The outlet 34 is shown in the FIGS. 3 to 5 as a pouring edge, but may also be constituted by an opening provided in the bowl just below its upper edge.

The embodiments of FIGS. 3 to 5 allow increased loading, due to the large size of the loading chamber.

I claim:

1. A ladle for serving soup, comprising a substantially hemispherical bowl which has a circular edge and is provided with a handle, wherein the improvement comprises an inner boat-shaped receptacle which has a generally V-shaped cross-section, formed by two sides of the boat-shaped receptacle which meet at the bottom of the receptacle, which sides converge at both ends of the receptacle, and have edges which also converge at both ends of the receptacle, said receptacle being supported by the bowl in a generally inverted position relative to the bowl, with one side of the boat-shaped receptacle generally conforming to and slightly spaced from the inner surface of the bowl at one side of the bowl, the space between said side of the boat-shaped receptacle and the inner surface of the bowl forming a pouring passage extending from an inlet slot between the edge of such receptacle and the inner surface of the bowl to a discharge slot between the edge of the bowl and the bottom of such receptacle.

2. A ladle according to claim 1 wherein the inlet slot is covered by a strainer.

3. A ladle as claimed in claim 2 wherein the bottom of the boat-shaped receptacle is pivotably supported on a hinge adjacent to the edge of the bowl, the strainer is carried by the receptacle, and the receptacle is pivotable between a position in which the strainer engages the bowl and a position in which the strainer is spaced from the bowl.

* * * * *